(12) United States Patent
Balma

(10) Patent No.: US 10,457,203 B2
(45) Date of Patent: Oct. 29, 2019

(54) VEHICLE SEAT

(71) Applicant: RUSPA OFFICINE S.p.A., Robassomero (IT)

(72) Inventor: Giorgio Balma, Robassomero (IT)

(73) Assignee: RUSPA OFFICINE S.P.A., Robassomero (IT)

( * ) Notice: Subject to any disclaimer, the term of this patent is extended or adjusted under 35 U.S.C. 154(b) by 0 days.

(21) Appl. No.: 15/970,306

(22) Filed: May 3, 2018

(65) Prior Publication Data

US 2018/0319330 A1    Nov. 8, 2018

(30) Foreign Application Priority Data

May 3, 2017    (IT) .......................... 102017000047737

(51) Int. Cl.
    *B60N 2/68* (2006.01)
    *B60Q 3/233* (2017.01)
    (Continued)

(52) U.S. Cl.
    CPC .............. *B60Q 3/233* (2017.02); *B60N 2/68* (2013.01); *B60N 2/686* (2013.01); *B60N 2/803* (2018.02);
    (Continued)

(58) Field of Classification Search
    CPC .......... B60Q 3/233; B60Q 3/43; B60N 2/803; B60N 2/68; B60N 2/686
    (Continued)

(56) References Cited

U.S. PATENT DOCUMENTS 4,036,527 A    7/1977 Faul
5,464,273 A *  11/1995 Makoto ................. B60N 2/242
                                                    297/232

(Continued)

FOREIGN PATENT DOCUMENTS

DE    19705603 A1    8/1998
EP     1332914 A1    8/2003
(Continued)

OTHER PUBLICATIONS

Search Report for Italian Application No. 102017000047737 dated Jan. 19, 2018, 9 pages.

*Primary Examiner* — Rodney B White
(74) *Attorney, Agent, or Firm* — Christopher J. Knors; Moore & Van Allen PLLC

(57) ABSTRACT

A vehicle seat comprising a support structure and a first and second shaped panel supported by the support structure and respectively comprising the seat and the backrest of the seat. The support structure comprises a first and a second side support element which are stably connected to each other by means of a first upper C-shaped connection element and a second lower C-shaped connection element. The second panel has a lower end edge positioned opposite to the upper edge supported by the first upper connection element. The lower end edge is directly attached to an end edge of the first panel which is positioned on the opposite side to the edge facing the second lower C-shaped connection element. The first and second panels overlap each other at the contact area between the two edges. The first C-shaped connection element is provided with a plurality of light generating elements suitable to create a light beam directly from the first upper C-shaped connection element towards the lower end edge of the second panel and to light a lower area of the seat.

12 Claims, 4 Drawing Sheets

(51) Int. Cl.
  *B60Q 3/43*   (2017.01)
  *B60N 2/803*  (2018.01)
  *F21Y 115/10* (2016.01)
  *F21W 106/00* (2018.01)

(52) U.S. Cl.
  CPC .......... *B60Q 3/43* (2017.02); *F21W 2106/00* (2018.01); *F21Y 2115/10* (2016.08)

(58) Field of Classification Search
  USPC ............. 297/452.13, 452.56, 440.15, 440.16
  See application file for complete search history.

(56) References Cited

U.S. PATENT DOCUMENTS

| | | | | |
|---|---|---|---|---|
| 6,739,671 B2* | 5/2004 | De Maina | ............ | B60N 2/7011 |
| | | | | 297/440.1 |
| 8,727,445 B2* | 5/2014 | De Maina | .............. | B60N 2/686 |
| | | | | 297/452.56 X |
| 8,931,849 B2* | 1/2015 | Kusch | .................... | A47C 1/124 |
| | | | | 297/452.13 X |
| 9,296,322 B2* | 3/2016 | Ruspa | ................. | B60N 2/686 |

FOREIGN PATENT DOCUMENTS

| | | | |
|---|---|---|---|
| EP | 2366584 A1 | 9/2011 | |
| EP | 2829436 A1 | 1/2015 | |

\* cited by examiner

VEHICLE SEAT

CROSS-REFERENCE TO RELATED APPLICATION

This application claims the benefit of Italian Patent Application No. 102017000047737 filed May 3, 2017.

TECHNICAL FIELD

The present invention relates to a vehicle seat.

In particular, the purpose of the present invention is to obtain a vehicle seat which comprises a limited number of parts, can be manufactured quickly and cost effectively, has a robust structure, can be manufactured by non-specialised workers, and is provided with integrated lighting elements.

BACKGROUND OF THE INVENTION

For example, the European patent EP1332914B1 by the same Applicant describes a vehicle seat comprising a support structure and a first and second shaped panel supported by the support structure and respectively forming the seat and the backrest of the seat. The support structure comprises a first and a second side support element (generally made of metal, e.g. aluminium) which extends along opposite sides of the seat and which are interconnected by a transverse element which extends to the area where the seat joins the backrest. Each side support element comprises a first rectilinear section and a second rectilinear section, typically longer than the first section and interconnected with the first section through an integrated folded joining zone.

According to European patent EP1332914B1, each first rectilinear section has a first groove extending over substantially its entire length and each second rectilinear section has a second groove extending over substantially its entire length. The first grooves are arranged facing each other and are suitable to house the respective opposite side edges of the first panel forming the seat, while the second grooves are arranged facing each other and are suitable to house the respective opposite side edges of the second panel forming the backrest.

This results in a simple, sturdy seat that can be quickly assembled and disassembled. In particular, the seat according to EP1332914B1 allows for a quick replacement of the seat and/or the backrest if these parts have been damaged by vandalism.

The European patent EP2366584 describes a vehicle seat comprising a support structure and a first and second shaped panel supported by the support structure and respectively forming the seat and seat backrest, the support structure comprising a first and a second side support element extending along opposite sides of the seat and interconnected by a transverse element extending to the area joining the seat and the backrest. Each side support element comprises a first rectilinear section and a second rectilinear section which is longer than the first section and interconnected with the first section through a folded joining area. Each first/second rectilinear section is provided with an elongated groove which communicates with the outside through an elongated opening whose width is smaller than the maximum width of the groove section. At least one pair of appendices extend from the first lower face of the first shaped panel and have sections complementary to that of the groove inside which they are housed, ensuring stable attachment of the first panel to the support structure. A second upper face of the first panel is covered with at least one flexible finish sheet which comprises side end portions extending beyond the side edges of the first panel defining a folded section underneath the first panel; this folded section is pressed between a perimeter portion of the second face of the panel and a portion of the first rectilinear section. The second shaped panel has a similar structure.

SUMMARY OF THE INVENTION

The object of the present invention is to improve the seat according to the patent EP1332914B1 or EP2366584 in order to obtain a version, which comprises fewer parts and is at the same time robust and of general application.

A further object of the present invention is to obtain a seat of the type described above which is equipped with lighting elements which can be used by the user of a seat positioned rearwards.

The previous object is achieved by the present invention in that it relates to a vehicle seat comprising a support structure and a first and second shaped panel supported by the support structure and respectively forming the seat and backrest of the seat, the support structure comprises a first and a second side support element which extend along opposite sides of the seat and are made in one piece; each side support element comprises a first rectilinear section and a second rectilinear section interconnected with the first section through a folded joining area, each first rectilinear section has a first elongated groove which extends the entire length of the section and communicates with the outside; the first grooves face each other and are suitable to house the first side lips of the first panel which is thus stably held between the first and second support elements; each second rectilinear section is provided with a second elongated groove which extends along the entire length of the section and communicates with the outside; the second grooves face each other and are suitable to house the second side lips of the second panel, which is thus stably held between the first and second support elements; the said support structure further comprises: —a first upper C-shaped connection element comprising a substantially rectilinear central section and two curved end portions provided with integral appendices, each respectively stably inserted into an end portion of a second rectilinear section; a second lower C-shaped connection element comprising a substantially rectilinear central section and two curved end portions provided with integral appendices, each respectively firmly inserted into a portion of the end of a first rectilinear section; the first and second C-shaped connection elements between them stably connect the first side support element and the second side support element together; the second panel has a lower end edge opposite the upper edge facing the first connection element; this lower end edge is directly attached to an end edge of the first panel which is on the opposite side to the edge facing the second lower C-shaped connection element; the first and second panels overlap at the contact area between the two edges.

BRIEF DESCRIPTION OF THE DRAWINGS

The invention will now be illustrated with reference to the attached drawings which show a preferred non-limiting embodiment of it wherein.

DETAILED DESCRIPTION

Figure 1:
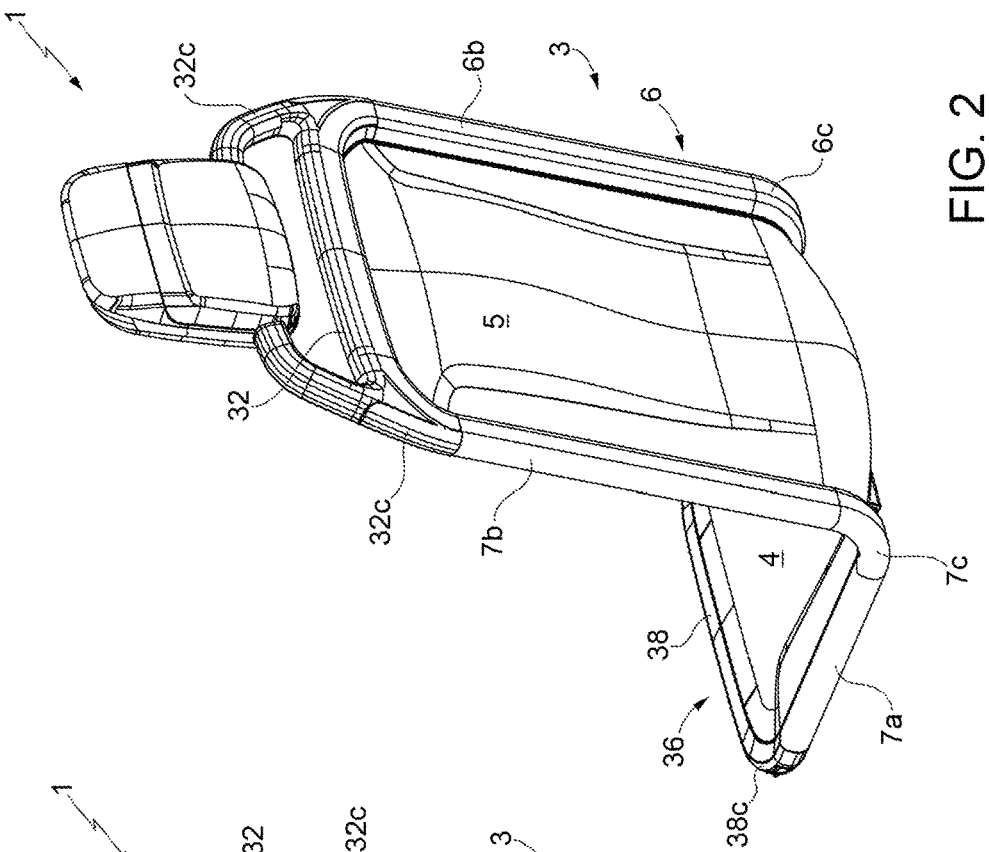
FIG. 1 shows, in rear perspective view, a vehicle seat made according to the dictates of the present invention.
Figure 2:
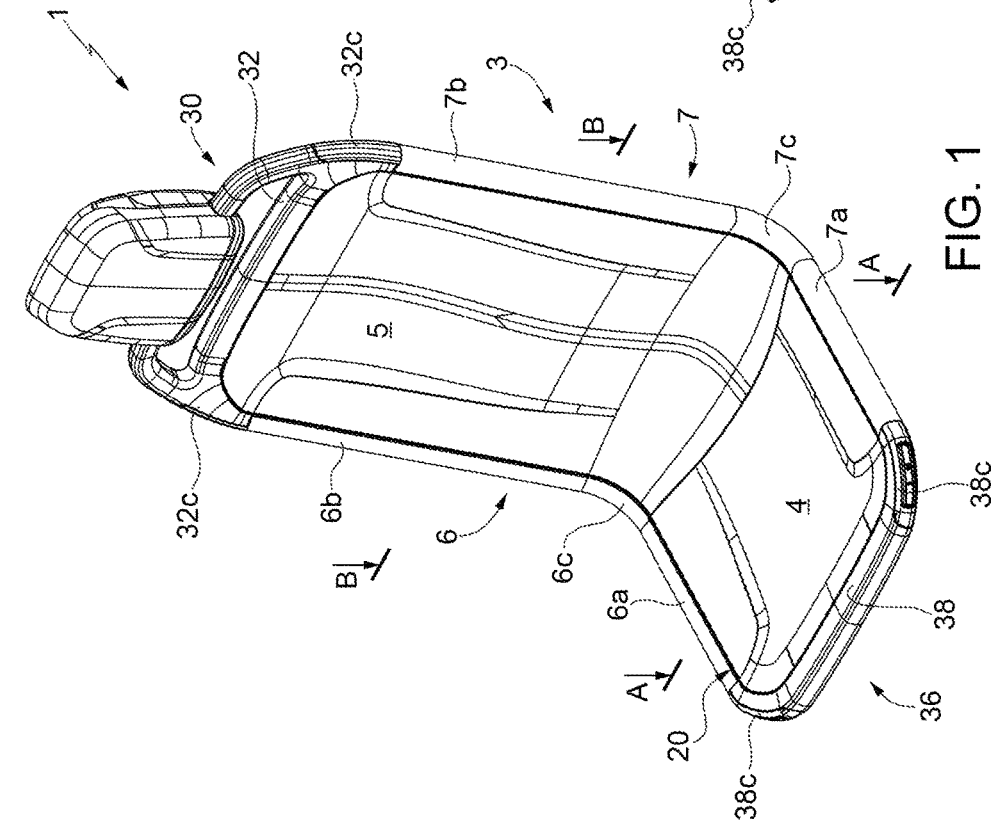
FIG. 2 shows, in rear perspective view, a vehicle seat made according to the dictates of the present invention.

With reference to FIGS. 1 and 2, the number 1 designates, in its entirety, a vehicle seat.

The vehicle seat 1 comprises a metallic support structure 3 and a first and second shaped panel 4, 5 supported by the support structure 3 and respectively comprising the seat and the backrest of the seat 1. Conveniently, the shaped panels 4, 5 are each made from a single piece of moulded plastic. The first panel 4 has an approximately square perimeter (FIG. 1) and the second panel 5 has an approximately rectangular perimeter.

The support structure 3 comprises a first and a second side support element 6, 7 which extend along opposite sides of the seat 1 and which are each made of a single piece of metal, for example a section of aluminium tubing.

Each side support element 6, 7 comprises a first rectilinear section 6a, 7a and a second rectilinear section 6b, 7b interconnected with said first section 6a, 7a through an integrated C-shaped joining area 6c, 7c.

Figure 6:
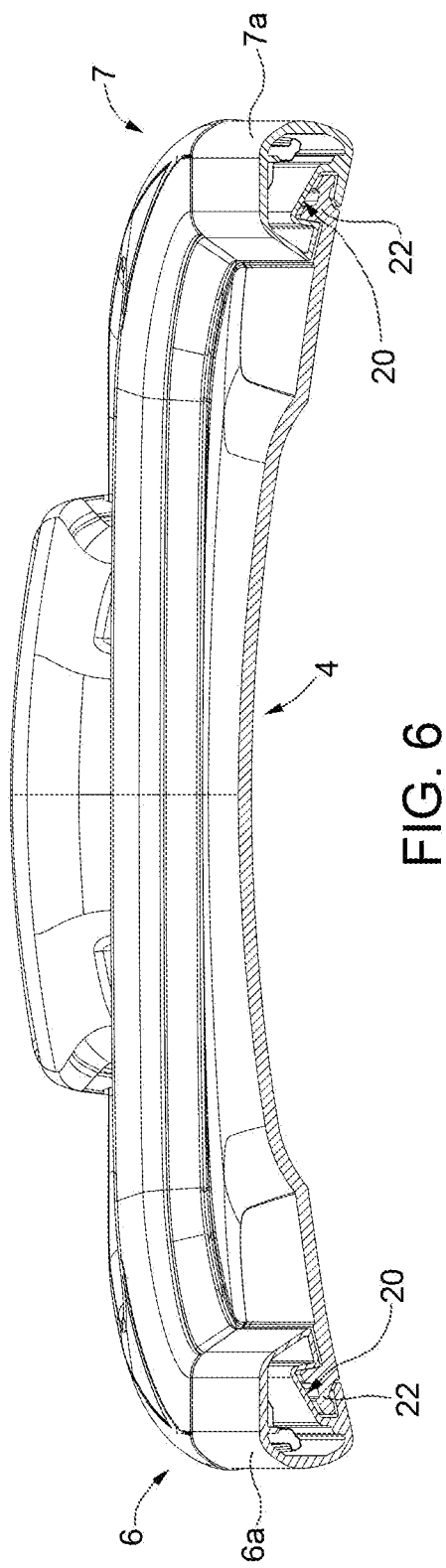
FIG. 6 shows a section of the seat taken in the plane A-A of FIG. 1.
Figure 7:
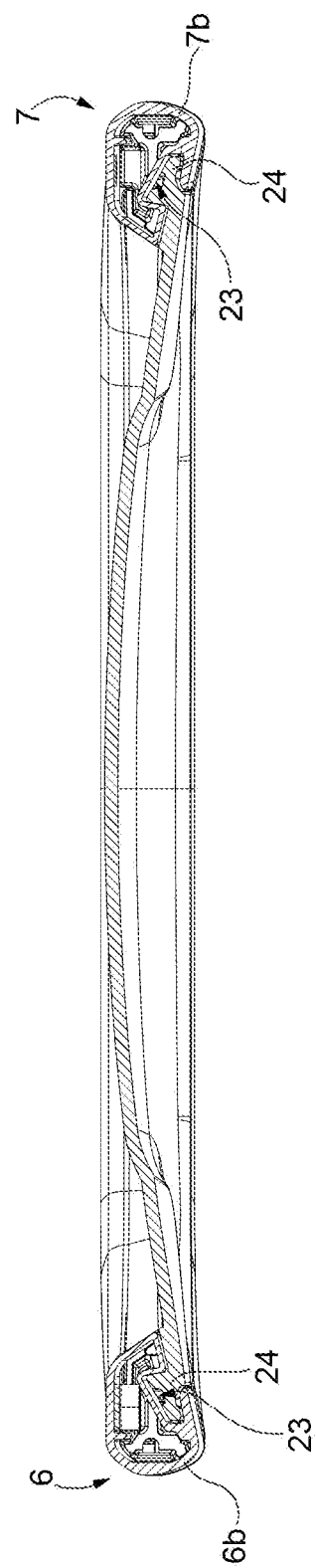
FIG. 7 shows a section of the seat taken in the plane B-B of FIG. 1.

Each first rectilinear section 6a, 7a is provided with a first elongated groove 20 (FIG. 6) which extends along the entire length of the section 6a, 7a and communicates with the outside. The grooves 20 are opposite one another and are suitable to house respective first side lips 22 of the first panel 4 which is thus stably held between the first and the second support elements 6, 7.

Each second rectilinear section 6b, 7b is provided with a second elongated groove 23, which extends along the entire length of the section 6b, 7b and communicates with the outside. The grooves 23 are opposite one another and are suitable to house respective second side lips 24 of the second panel 5 which is thus stably held between the first and the second support elements 6, 7).

The support structure 3 further comprises:
a first upper C-shaped connection element 30 comprising a substantially rectilinear central portion 32 and two curved end portions 32c provided with integral appendices 35 respectively stably inserted in an upper end portion of a second rectilinear section 6b, 7b;
a second lower C-shaped connection element 36 comprising a substantially rectilinear central portion 38 and two curved end portions 38c provided with integral appendices (not shown) respectively stably inserted in an end portion of a first rectilinear section 6a, 7a.

The first and second C-shaped connection elements 30, 36 between them stably connect the first side support element 6 and the second side support element 7.

Figure 3:
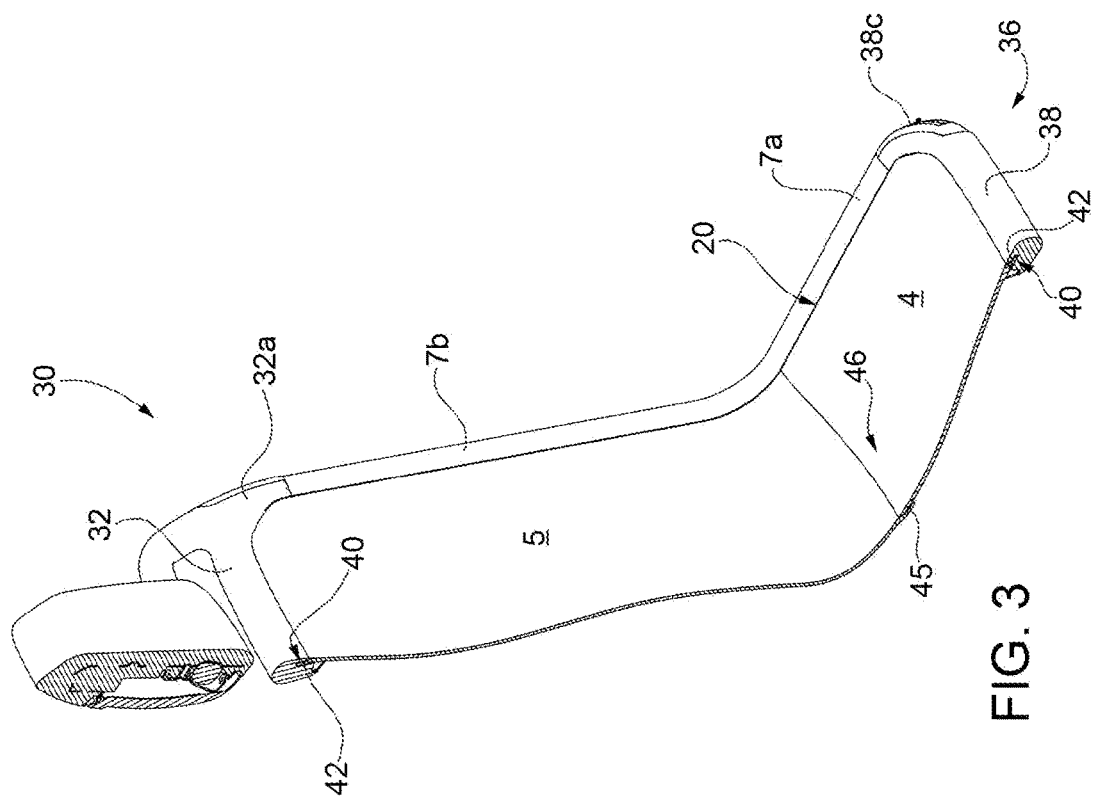
FIG. 3 shows, in perspective view and in section, a vehicle seat made according to the dictates of the present invention.

The first and second connection elements 30, 36 are provided with a respective groove 40 (FIG. 3) in which a front lip 42 of the backrest 5/of the seat 4 is inserted.

The second panel 5 (FIG. 3) has a lower end edge 45 positioned on the side facing the upper edge (front lip 42) supported by the first connection element 30. This lower end edge 45 is directly attached to an end edge 46 of the first panel 4 which is positioned on the opposite side to the edge (front lip 42) facing the second lower C-shaped connection element 36. The first and second panels 4, 5 thus overlap each other at the contact area between the two edges 45, 46.

The seat obtained as described above has the same strength and rigidity as the seat obtained in accordance with European Patent EP-B-1.332.914, even though it does not have the transverse element, which extends at the area where the seat joins the backrest. Since it is made from one fewer component, the seat 1 has a simpler structure and is easier to assemble. The patent Applicant has in fact noticed how—in a very unexpected way—the direct overlap between the two edges 45, 46 creates a stable connection between the panels 4, 5 which, being held laterally by the first and second side support element 6, 7, behave like a single plastic panel in terms of overall rigidity.

Figure 4:
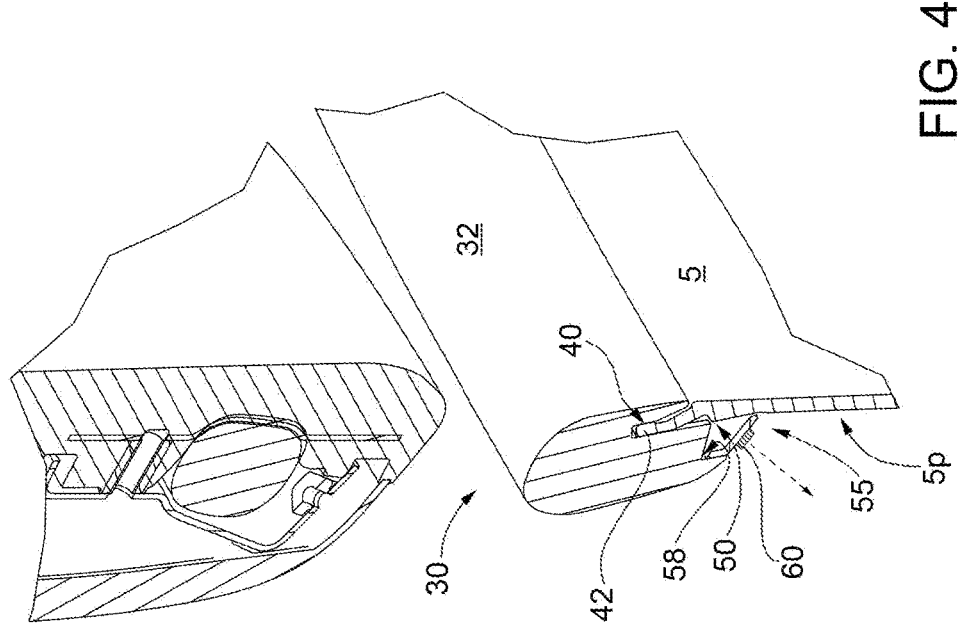
FIG. 4 shows, in section and in enlarged scale, a portion of the vehicle seat made according to the dictates of the present invention.

The first upper C-shaped connection element 30 is provided with an elongated seat 50 (FIG. 4) which opens out along a central portion 32 along the curved end portions 32c. A portion of this elongated seat defines a groove 40 which houses the front lip 42 of the panel 5.

Figure 5:
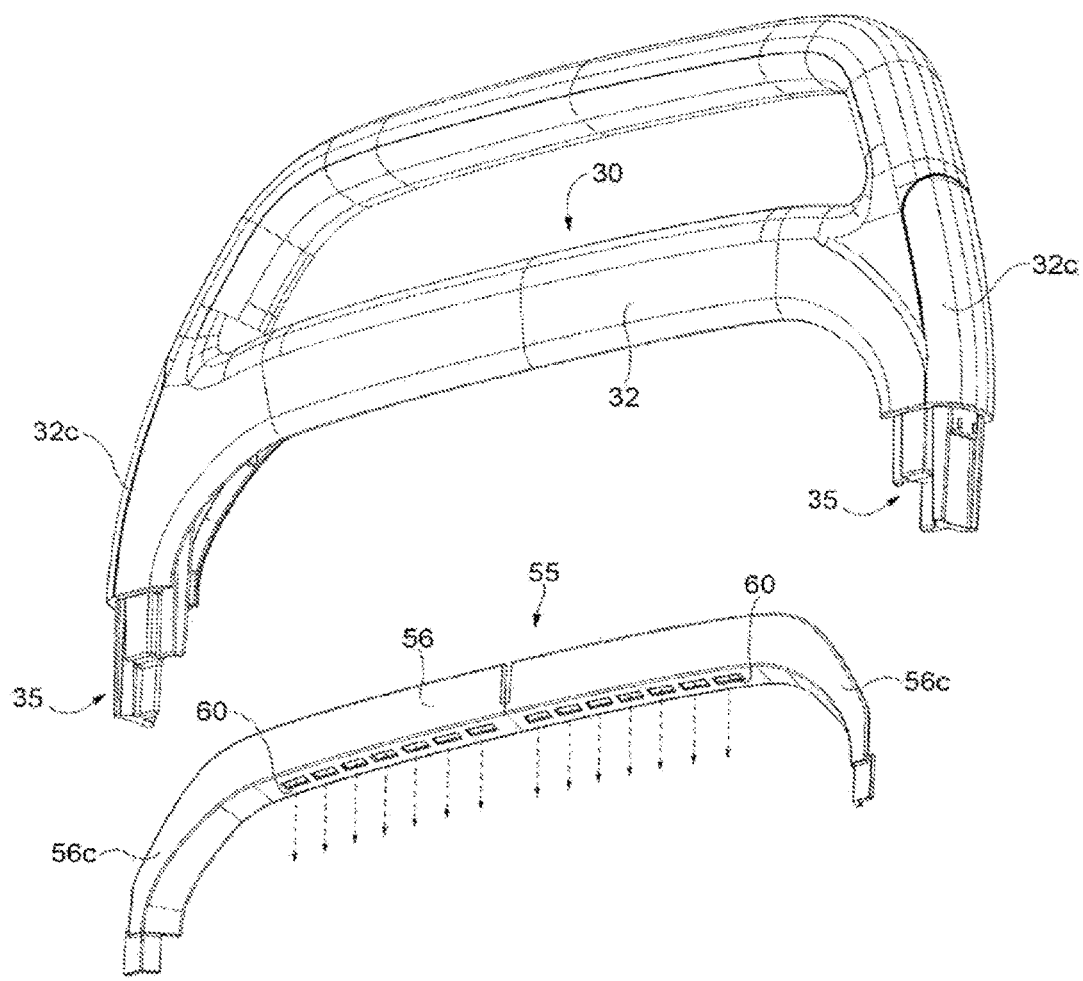
FIG. 5 shows, in exploded perspective view, the upper portion of a vehicle seat made according to the dictates of the present invention.

A C-shaped cover element 55 provided with a substantially rectilinear central portion 56 (FIG. 5) and with two curved end portions 56c is partially inserted into the seat 50 and is interposed between an internal wall 58 of the seat 50 which creates a shoulder and a rear face 5p (FIG. 4) of the first panel 5. The cover element 55 thus closes the elongated seat 50.

The C-shaped cover element 55 is provided with a plurality of light generating elements 60 arranged so as to create a light beam (indicated with the arrow in FIG. 5) directed from the first upper C-shaped connection element 30 towards the lower end edge 45 (FIG. 3) of the second panel 5 and to light a lower area of the seat 1.

Conveniently, the light generating elements 60 comprise a plurality of light emitting diodes (LEDs) aligned along the cover element 55 and supported by a face of the cover element 55 facing outwards (i.e. by the opposite side with respect to the seat 50). Conveniently, the LEDs are covered with a cover made of plastic or opalescent material (not shown for simplicity) which covers and protects a strip of LEDs.

Alternatively, the light generating elements 60 comprise a plurality of light emitting diodes (LEDs) which are aligned along the cover element 55 and supported by a face of the cover element 55 facing the inside of the seat 50; each LED is associated with a respective opening (not shown) formed in the cover element 55.

The cover element 55 used for closing the seat 50 can thus be used for a further purpose, namely to create a light source which illuminates the portion of the seat arranged behind the backrest. This light source may be beneficially used by a user occupying a rear seat.

The seat is thus beneficially usable in arrangements where the facing seats or pairs of facing seats are arranged in successive rows, such as on buses for extra-urban transport. The LEDs are a beneficial replacement for the spot lights that are usually located above bus seats.

Finally, it is clear that modifications and variations can be made to the vehicle seat described and illustrated without thereby departing from the protective scope of the present invention.

The invention claimed is:

1. A vehicle seat comprising a support structure and a first and a second shaped panel supported by the support structure and respectively forming the seat and the backrest of the seat, the support structure comprises a first and a second side support element which extend along opposite sides of the seat and is a single piece;
- each side support element comprises a first rectilinear section and a second rectilinear section interconnected with said first section through a folded joining area,
- each first rectilinear section is provided with a first elongated groove that extends along the entire length of the section; the first grooves are opposite one another and house respective first side lips of the first panel, which is held between the first and the second support elements;
- each second rectilinear section is provided with a second elongated groove that extends along the entire length of the section; the second grooves are opposite to one another and house respective second side lips of the second panel, which is held between the first and the second support elements;

the said support structure further comprises:
- a first upper C-shaped connection element comprising a substantially rectilinear central portion and two curved end portions provided with integral appendices, respectively, stably inserted in an end portion of a second rectilinear section;
- a second lower C-shaped connection element comprising a substantially rectilinear central portion and two curved end portions provided with integral appendices, respectively, stably inserted in an end portion of a first rectilinear section;
- wherein the first upper C-shaped and the second C-shaped connection elements stably connect the first side support element and the second side support element;
- wherein the second panel has a lower end edge positioned on the side facing the upper edge, opposite to the first connection element; said lower end edge directly hooks onto an end edge of the first panel which is positioned on the opposite side with respect to the edge opposite the second lower C-shaped connection element; and the first and the second panels overlap each other at the contact area between the two edges.

2. The seat according to claim 1, wherein the first upper C-shaped connection element is provided with an elongated seat which opens out along a central portion along the curved end portions;
- a C-shaped cover element provided with a substantially rectilinear central portion and with two curved end portions is partially inserted into the elongated seat and is interposed between an internal wall of the seat providing a shoulder and a rear face of the first panel; the cover element closes the elongated seat.

3. The seat according to claim 2, wherein said elongated seat has a portion that defines a groove which houses a front lip of the panel that defines the upper edge opposite the first connection element.

4. The seat according to claim 2, wherein said C-shaped cover element is provided with a plurality of light generating elements positioned so as to create a light beam directly from the first upper C-shaped connection element towards the lower end edge of the second panel and to light a rear area of said seat.

5. The seat according to claim 4, wherein the light generating elements comprise a plurality of light emitting diodes (LED) aligned along the cover element and supported by a face of the cover element facing outwards.

6. The seat according to claim 4, wherein the light generating elements comprise a plurality of light emitting diodes (LED) aligned along the cover element and supported by a face of the cover element facing the inside of the seat; each LED is associated with a respective opening formed in the cover element.

7. The seat according to claim 1 wherein each side support element comprises a section of hollow tubing.

8. A vehicle seat comprising a support structure and a first and a second shaped panel supported by the support structure and respectively forming the seat and the backrest of the seat, the support structure comprises a first and a second side support element which extend along opposite sides of the seat and is a single piece;
- each side support element comprises a first rectilinear section and a second rectilinear section interconnected with said first section through a folded joining area,
- each first rectilinear section is provided with a first elongated groove that extends along the entire length of the section; the first grooves are opposite one another and house respective first side lips of the first panel, which is held between the first and the second support elements;
- each second rectilinear section is provided with a second elongated groove that extends along the entire length of the section; the second grooves are opposite to one another and house respective second side lips of the second panel, which is held between the first and the second support elements;

the said support structure further comprises:
- a first upper C-shaped connection element comprising a substantially rectilinear central portion and two curved end portions provided with integral appendices, respectively, stably inserted in an end portion of a second rectilinear section;
- a second lower C-shaped connection element comprising a substantially rectilinear central portion and two curved end portions provided with integral appendices, respectively, stably inserted in an end portion of a first rectilinear section;
- wherein the first upper C-shaped and the second C-shaped connection elements stably connect the first side support element and the second side support element;
- wherein the second panel has a lower end edge positioned on the side facing the upper edge, opposite to the first connection element; said lower end edge directly hooks onto an end edge of the first panel which is positioned on the opposite side with respect to the edge opposite the second lower C-shaped connection element; and the first and the second panels overlap each other at the contact area between the two edges;
- wherein the first upper C-shaped connection element is provided with an elongated seat which opens out along a central portion along the curved end portions; and
- a C-shaped cover element provided with a substantially rectilinear central portion and with two curved end portions partially inserted into the elongated seat and interposed between an internal wall of the seat providing a shoulder and a rear face of the first panel; the cover element configured to close the elongated seat.

9. The seat according to claim 8, wherein said elongated seat has a portion that defines a groove which houses a front lip of the panel that defines the upper edge opposite the first connection element.

10. The seat according to claim 8, wherein said C-shaped cover element is provided with a plurality of light generating elements positioned so as to create a light beam directly from the first upper C-shaped connection element towards the lower end edge of the second panel and to light a rear area of said seat.

11. The seat according to claim 10, wherein the light generating elements comprise a plurality of light emitting diodes (LED) aligned along the cover element and supported by a face of the cover element facing outwards.

12. The seat according to claim 10, wherein the light generating elements comprise a plurality of light emitting diodes (LED) aligned along the cover element and supported by a face of the cover element facing the inside of the seat; each LED is associated with a respective opening formed in the cover element.

* * * * *